US010862790B2

(12) United States Patent
Crowder (10) Patent No.: US 10,862,790 B2
(45) Date of Patent: *Dec. 8, 2020

(54) OBJECT INTEGRITY VERIFICATION IN A CONTENT DELIVERY NETWORK (CDN)

(71) Applicant: LEVEL 3 COMMUNICATIONS, LLC, Broomfield, CO (US)

(72) Inventor: William Crowder, Camarillo, CA (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/429,455

(22) Filed: Jun. 3, 2019

(65) Prior Publication Data

US 2019/0288931 A1 Sep. 19, 2019

Related U.S. Application Data (63) Continuation of application No. 15/379,222, filed on Dec. 14, 2016, now Pat. No. 10,313,223.

(51) Int. Cl.
H04L 12/26 (2006.01)
H04L 29/08 (2006.01)
H04L 9/08 (2006.01)
H04L 9/32 (2006.01)

(52) U.S. Cl.
CPC ............ H04L 43/50 (2013.01); H04L 9/0869 (2013.01); H04L 9/3226 (2013.01); H04L 43/045 (2013.01); H04L 43/06 (2013.01); H04L 67/02 (2013.01)

(58) Field of Classification Search
CPC ....... H04L 43/045; H04L 43/06; H04L 43/50; H04L 67/02; H04L 9/0869; H04L 9/3226; H04N 21/44202; H04N 21/2408; H04N 21/44222; H04H 60/33
See application file for complete search history.

(56) References Cited

U.S. PATENT DOCUMENTS

| | | | |
|---|---|---|---|
| 8,560,579 | B1 | 10/2013 | Gross et al. |
| 9,552,191 | B2 | 1/2017 | Oram |
| 2002/0109616 | A1 | 8/2002 | Boudry |
| 2006/0150033 | A1 | 7/2006 | Kolb et al. |
| 2007/0100701 | A1 | 5/2007 | Boccon-Gibod et al. |
| 2008/0065724 | A1 | 3/2008 | Seed et al. |
| 2010/0274923 | A1 | 10/2010 | Dean |
| 2011/0182424 | A1 | 7/2011 | Grube |

(Continued)

OTHER PUBLICATIONS

International Search Report dated Dec. 7, 2017, Int'l Appl. No. PCT/US17/022692, Int'l Filing Date Mar. 16, 2017; 4 pgs.

(Continued)

Primary Examiner — Chirag R Patel (57) ABSTRACT

A computer-implemented method, in a content delivery (CD) network, wherein said CD network delivers content on behalf of multiple content providers. The method includes, at a client, requesting one or more parts of a randomly generated test object; in response to said requesting, receiving one or more response objects; generating one or more portions of said randomly generated test object, and comparing the one or more response objects received to at least some of the one or more portions of the object generated. Based on said comparing, when said one or more response objects received do not match said at least some of the one or more portions of the object generated, reporting and logging an error.

20 Claims, 8 Drawing Sheets

(56) References Cited

U.S. PATENT DOCUMENTS

| | | |
|---|---|---|
| 2012/0099593 A1 | 4/2012 | Luby |
| 2013/0086448 A1 | 4/2013 | Baptist |
| 2013/0166634 A1 | 6/2013 | Holland |
| 2014/0052288 A1 | 2/2014 | ElSiblani |
| 2014/0223002 A1 | 8/2014 | Varney et al. |
| 2015/0382075 A1 | 12/2015 | Neumeier |
| 2016/0065576 A1 | 3/2016 | Zhang |
| 2016/0337426 A1 | 11/2016 | Shribman |
| 2018/0069947 A1 | 3/2018 | Antipa |
| 2018/0167304 A1 | 6/2018 | Crowder |

OTHER PUBLICATIONS

Written Opinion of the International Searching Authority dated Dec. 7, 2017, Int'l Appl. No. PCT/US17/022692, Int'l Filing Date Mar. 16, 2017; 7 pgs.

Canada Examination Report, dated Jul. 15, 2019, Application No. 3,047,239, filed Mar. 16, 2017; 4 pgs.

International Preliminary Report on Patentability, dated Jun. 18, 2019, Int'l Appl. No. PCT/US17/022692; Int'l Filing Date Mar. 16, 2017; 9 pgs.

| |
|---|
| PRNG ID. |
| OBJECT SEED |
| OBJECT SIZE |
| SLICE SIZE(S) |

402

| PRNG ID. | OBJECT SIZE |
|---|---|
| SLICE #1 RANGE [0 ... X] | SLICE #1 SEED |
| SLICE #2 RANGE [X+1 ... Y] | SLICE #2 SEED |
|  |  |
| SLICE #K RANGE [P ... Q] (Q=SIZE) | SLICE #K SEED |

OBJECT INTEGRITY VERIFICATION IN A CONTENT DELIVERY NETWORK (CDN)

CROSS-REFERENCE TO RELATED APPLICATIONS

This application is a continuation of, and claims priority to, U.S. application Ser. No. 15/379,222, titled "OBJECT INTEGRITY VERIFICATION IN A CONTENT DELIVERY NETWORK (CDN)", filed Dec. 14, 2016, which is incorporated by reference herein for all purposes.

COPYRIGHT STATEMENT

This patent document contains material subject to copyright protection. The copyright owner has no objection to the reproduction of this patent document or any related materials in the files of the United States Patent and Trademark Office, but otherwise reserves all copyrights whatsoever.

BACKGROUND

Field of the Invention

This invention relates to content delivery and content delivery networks. More specifically, this invention relates to object integrity verification in content delivery networks (CDNs).

BRIEF DESCRIPTION OF THE DRAWINGS

Other objects, features, and characteristics of the present invention as well as the methods of operation and functions of the related elements of structure, and the combination of parts and economies of manufacture, will become more apparent upon consideration of the following description and the appended claims with reference to the accompanying drawings, all of which form a part of this specification.

DETAILED DESCRIPTION OF THE PRESENTLY PREFERRED EXEMPLARY EMBODIMENTS

Glossary

As used herein, unless used otherwise, the following terms or abbreviations have the following meanings:

CD means content delivery;
CDN or CD network means content delivery network;
DNS means domain name system;
RNG means random-number generator; and
PRNG means pseudorandom number generator;

A "mechanism" refers to any device(s), process(es), routine(s), service(s), module(s), or combination thereof. A mechanism may be implemented in hardware, software, firmware, using a special-purpose device, or any combination thereof. A mechanism may be integrated into a single device or it may be distributed over multiple devices. The various components of a mechanism may be co-located or distributed. The mechanism may be formed from other mechanisms. In general, as used herein, the term "mechanism" may thus be considered shorthand for the term device(s) and/or process(es) and/or service(s).

Description

A content delivery network (CDN) distributes content (e.g., resources) efficiently to clients on behalf of one or more content providers, preferably via a public Internet. Content providers provide their content (e.g., resources) via origin sources (origin servers or origins). A CDN can also provide an over-the-top transport mechanism for efficiently sending content in the reverse direction—from a client to an origin server. Both end-users (clients) and content providers benefit from using a CDN. Using a CDN, a content provider is able to take pressure off (and thereby reduce the load on) its own servers (e.g., its origin servers). Clients benefit by being able to obtain content with fewer delays.

Figure 1:
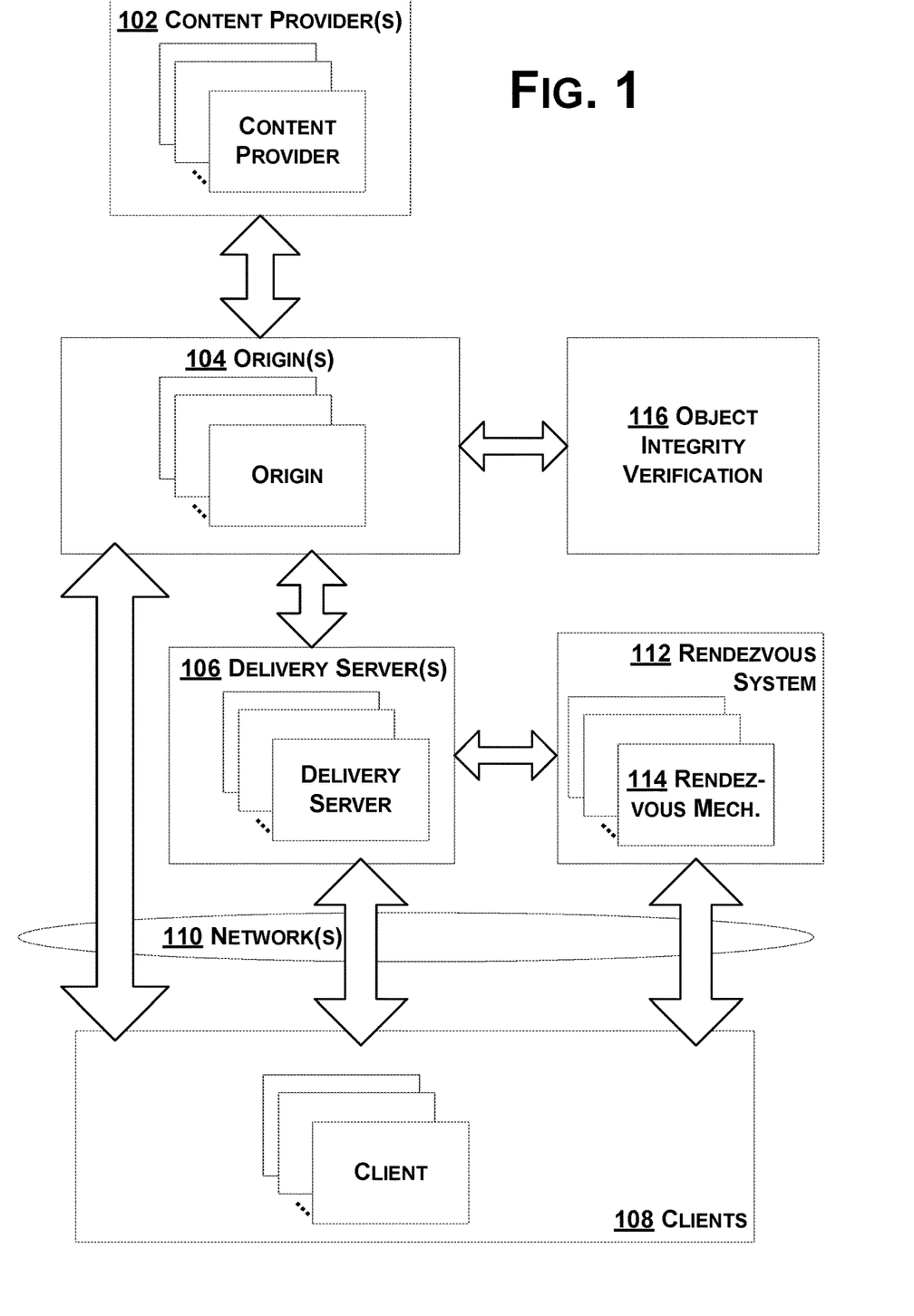
FIG. 1 depicts aspects of an exemplary content delivery network (CDN) according to exemplary embodiments hereof.

FIG. 1 shows aspects of an exemplary CDN in which one or more content providers 102 provide content via one or more origin sources 104 and delivery services (servers) 106 to clients 108 via one or more networks 110. The delivery services (servers) 106 may form a delivery network from which clients 108 may obtain content. The delivery services 106 may be logically and/or physically organized hierarchically and may include edge caches.

As should be appreciated, components of a CDN (e.g., delivery servers or the like) may use the CDN to deliver content to other CDN components. Thus a CDN component may itself be a client of the CDN. For example, the CDN may use its own infrastructure to deliver CDN content (e.g., CDN control and configuration information) to CDN components.

Client requests (e.g., for content) may be associated with delivery server(s) 106 by a rendezvous system 112 comprising one or more rendezvous mechanism(s) 114, possibly in the form of one or more rendezvous networks. The rendezvous mechanism(s) 114 may be implemented, at least in part, using or as part of a DNS system, and the association of a particular client request (e.g., for content) with one or more delivery servers may be done as part of DNS processing associated with that particular client request (e.g., DNS processing of a domain name associated with the particular client request).

As should be appreciated, typically, multiple delivery servers 106 in the CDN can process or handle any particular client request for content (e.g., for one or more resources). Preferably the rendezvous system 112 associates a particular client request with one or more "best" or "optimal" (or "least worst") delivery servers 106 (or clusters) to deal with that particular request. The "best" or "optimal" delivery server(s) 106 (or cluster(s)) may be one(s) that is (are) close to the client (by some measure of network cost) and that is (are) not overloaded. Preferably the chosen delivery server(s) 106 (or cluster(s)) (i.e., the delivery server(s) or cluster(s) chosen by the rendezvous system 112 for a client request) can deliver the requested content to the client or can direct the client, somehow and in some manner, to somewhere where the client can try to obtain the requested content. A chosen delivery server 106 (or cluster) need not have the requested content at the time the request is made, even if that chosen delivery server 106 (or cluster) eventually serves the requested content to the requesting client.

Exemplary CDNs are described in U.S. Pat. Nos. 8,060,613 and 8,825,830, the entire contents of both of which are fully incorporated herein by reference in their entirety and for all purposes.

The rendezvous system 112 may be implemented, at least in part, as described in U.S. Pat. No. 7,822,871 titled "Configurable Adaptive Global Traffic Control And Management," filed Sep. 30, 2002, issued Oct. 26, 2010.

Figure 2:
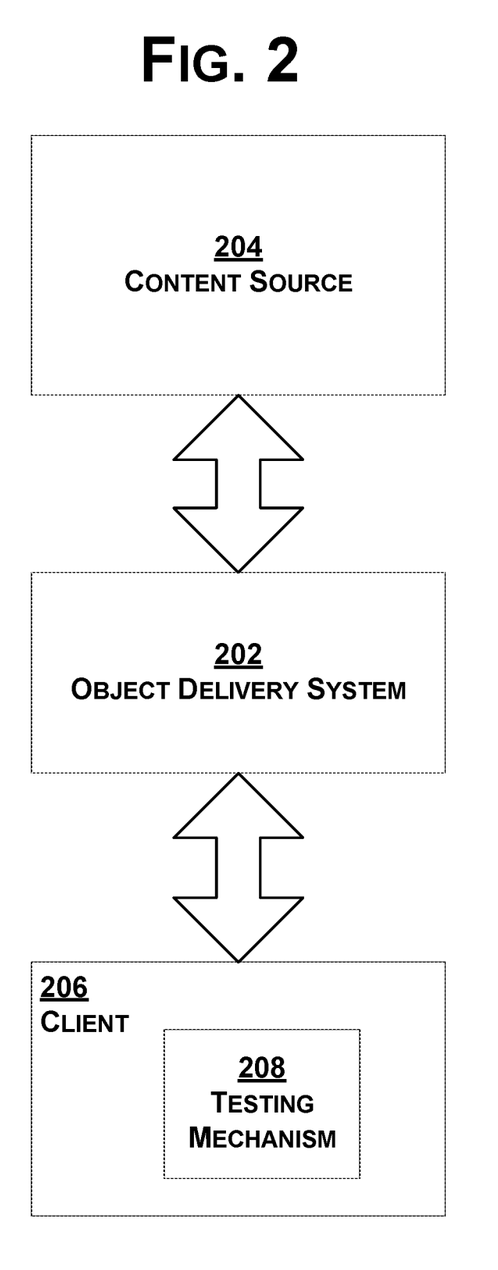
FIG. 2 depicts aspects of a content transport integrity verification system according to exemplary embodiments hereof.

In some aspects, a CDN acts as an object delivery system. For example, as shown in FIG. 2, a CDN may provide aspects of a content delivery system 202 to deliver content from a content source 204 to a client 206. The content source 204 may correspond to an arbitrary component of the CDN shown in FIG. 1. For example, the content source 204 may be one or more of: a content provider 102, an origin source 104, a delivery sever 106, etc. Likewise, since (as noted above) components of a CDN (e.g., delivery servers or the like) may use the CDN to deliver content to other CDN components, the client 206 may be or correspond to an arbitrary component of the CDN (e.g., a content provider 102, an origin source 104, a delivery sever 106, or a CDN client 108).

In operation, an object being delivered (e.g., served) by the CDN to a client may be stored, possibly in pieces, in one or more intermediate caches.

As should be appreciated, a CDN provides an extremely complex object delivery system, and it is important to test the end-to-end integrity of such a system. As objects and networks get complex, errors may be introduced.

One way to test the end-to-end integrity of a CDN is to generate a test resource or object (e.g., at a content source 204). A testing mechanism 208 at a client 206 may then request an arbitrary portion of the generated object from the content source 204. The content source 204 then delivers the requested portion of the object to the requesting client 206. Once the requested portion of the object is received at the client 206, the testing mechanism 208 at the client compares the received portion of the object with the expected portion in order to determine if the correct data were received.

Preferably the test resource or object is randomly generated. (See below on random number generation.) As should be appreciated, the use of pseudo-randomly generated data is important to avoid the masking of bugs due to interactions between the object and the delivery mechanism(s). For example, suppose an object has a pattern that repeats every 1024 bytes. Using such an object for end-to-end testing may be problematic, because all that would be proven is that some arbitrary portion of the object is being properly delivered.

Figure 3A:
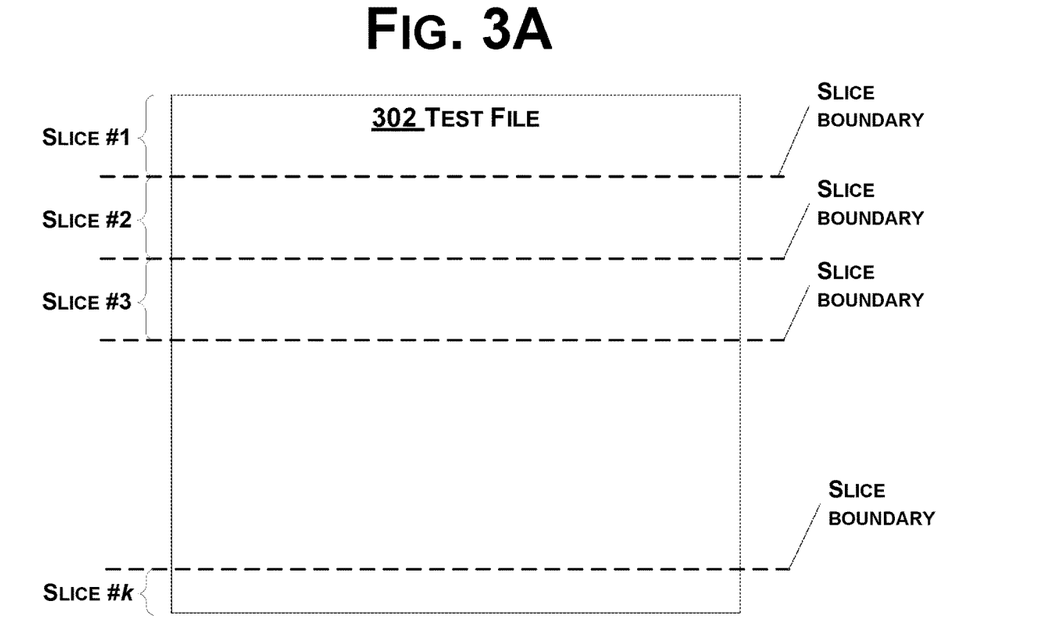
FIG. 3A depicts aspects of a randomly generated test object according to exemplary embodiments hereof.

As noted, the testing mechanism 208 may request an arbitrary portion of the test resource or object. With reference to FIG. 3A, a test object (test file 302) may be logically considered to consist of a number of pieces or slices (denoted slice #1, slice #2, ..., slice #k in the drawing). The slices are separated at logical slice boundaries. The slices need not all be of the same size.

Figure 3B:
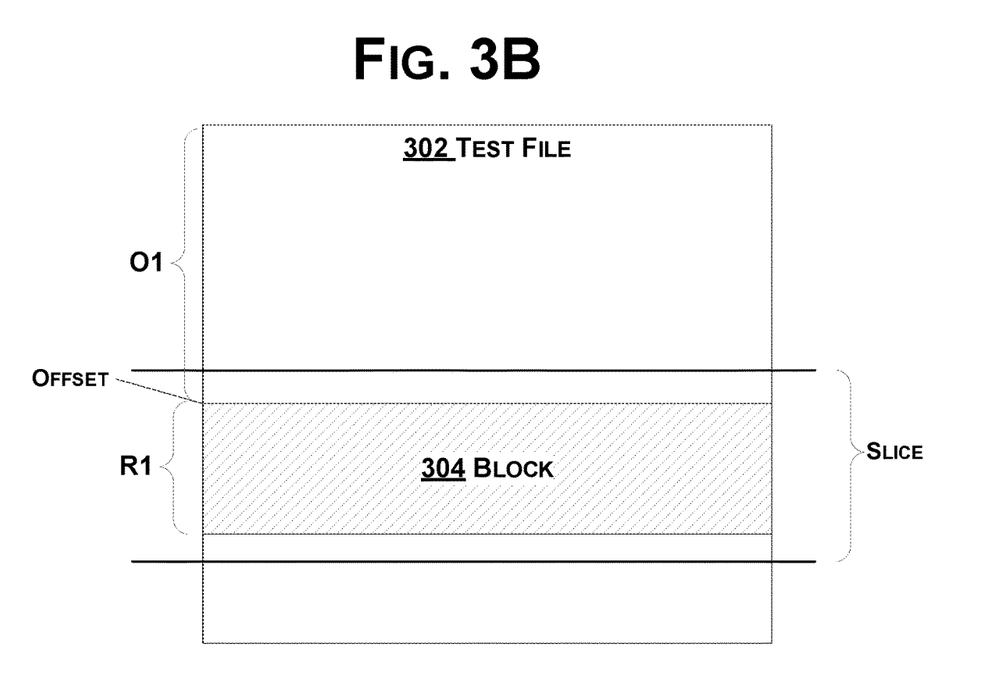
FIGS. 3B-3D depict aspects of testing according to exemplary embodiments hereof.
Figure 3C:
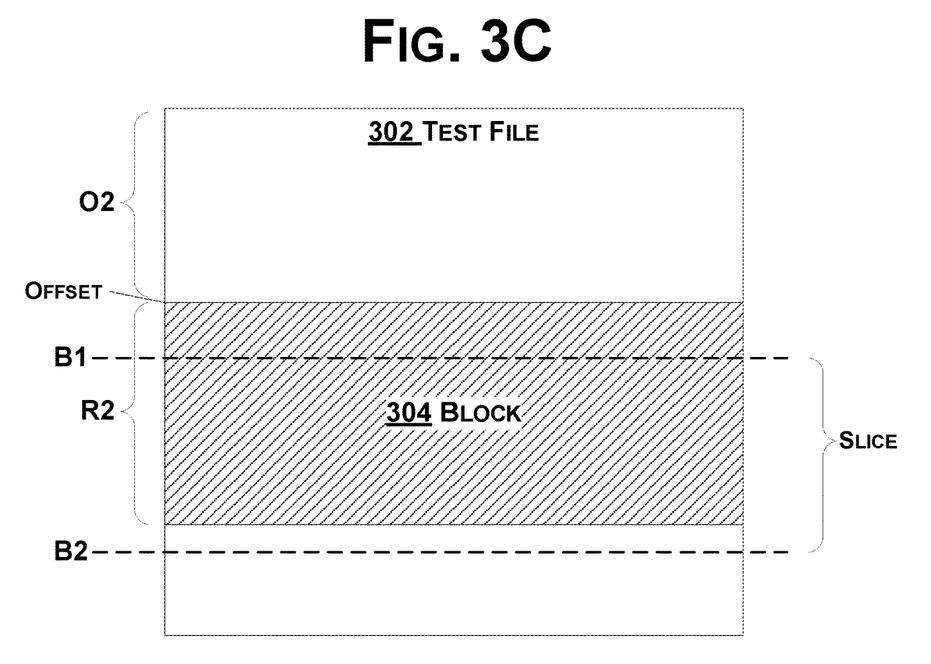
Figure 3D:
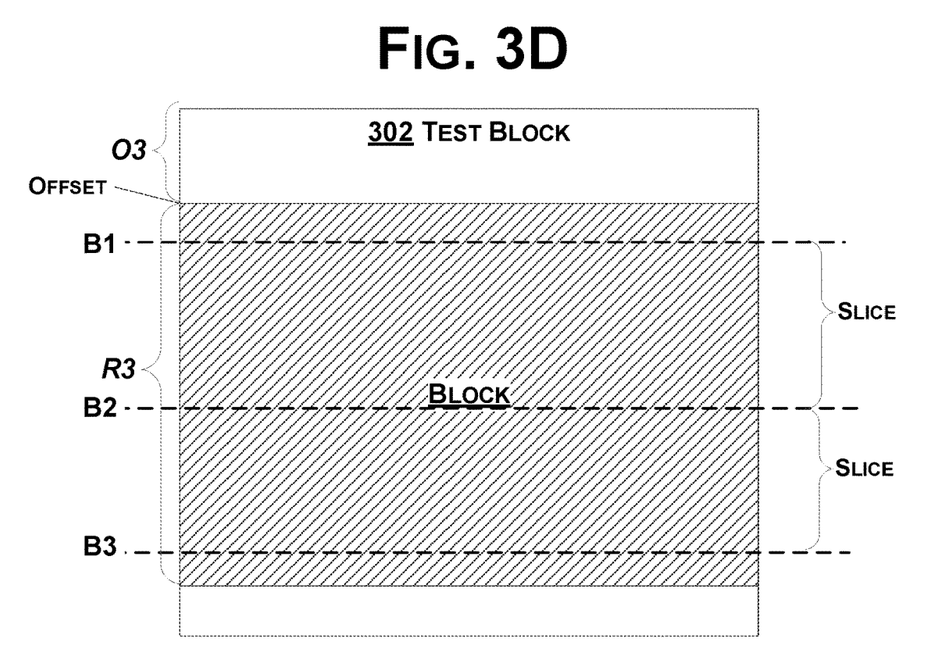

The requested portion of the test object (e.g., test file 302) may be a block 304 that falls entirely within a single slice (e.g., as shown in FIG. 3B) or may span one or more slice boundaries (e.g., as shown in FIGS. 3C-3D). The request may be specified, e.g., as an offset and range within the test object. Thus, in the example shown in FIG. 3B, the requested block 304 starts at offset O1 in the test file 302, and has a range R1. The offset and range may be specified, e.g., in bytes. In the example shown in FIG. 3C, the requested block 304 starts at offset O2 in the test file 302, and has a range R2, and in the example shown in FIG. 3D, the requested block 304 starts at offset O3 in the test file 302 and has a range R3.

As noted above, when the requested portion of the object is received at the client 206, the testing mechanism 208 at the client compares the received portion of the object with the expected portion in order to determine if the correct data were received. In order to make this comparison, the client 206 needs to have a "true" version of the requested portion of the requested object. If, as discussed above, the test resource is randomly generated, then the testing mechanism 208 can generate the same resource using the same PRNG mechanism and seed (and object size) as were used to generate/create the test object at the content source 204.

Note on Random Numbers

The following discussion on random numbers and random number generators is provided, without loss of generality, to aid the reader of this description.

A random-number generator (RNG) is a mechanism (e.g., an algorithm or computational or physical device) designed to generate a sequence of numbers or symbols that cannot be reasonably predicted better than by a random chance. A pseudorandom number generator (PRNG), is a mechanism (e.g., an algorithm or computational or physical device) for generating a sequence of numbers whose properties approximate the properties of sequences of random numbers. As used herein, the terms RNG and PRNG are used interchangeably, it being understood that most computer-implemented RNGs are essentially PRNGs.

As is well known, a seed is a value (e.g., a number or vector) used to initialize a pseudorandom number generator. For this description it is assumed that the PRNG mechanism requires or uses a seed and that the same PRNG and seed combination will produce the same sequence of random numbers if run at different times and/or on different computers. Thus, given a seed S and PRNG=rand( ), invoking the function rand( ) K times, initialized with seed S, will produce the same sequence of K random numbers. The PRNG rand( ), initialized with a different seed, $S2 \neq S$ may (and likely will) produce a different sequence of random numbers.

A given PRNG, invoked k times, with a seed S, produces the pseudo-random sequence $r_1, r_2, \ldots, r_k$.

For the sake of this description, invocation of a PRNG is denoted PRNG( ) or prng( ).

Assuming, without loss of generality, that a particular PRNG produces a number (an integer) in the range 0 to S, i.e., [0, S). As is well known, a number (also an integer) in the range [0, K) for some integer K may be generated using modulo arithmetic, e.g., as (PRNG( ) mod K). Thus, e.g., PRNG( ) mod 1234 will produce a random number in the range [0, 1233). To produce a random number in the range [P, Q) (where Q>P), use: [P+(PRNG( ) mod (Q−P))].

End of Note on Random Numbers

Figure 4A:
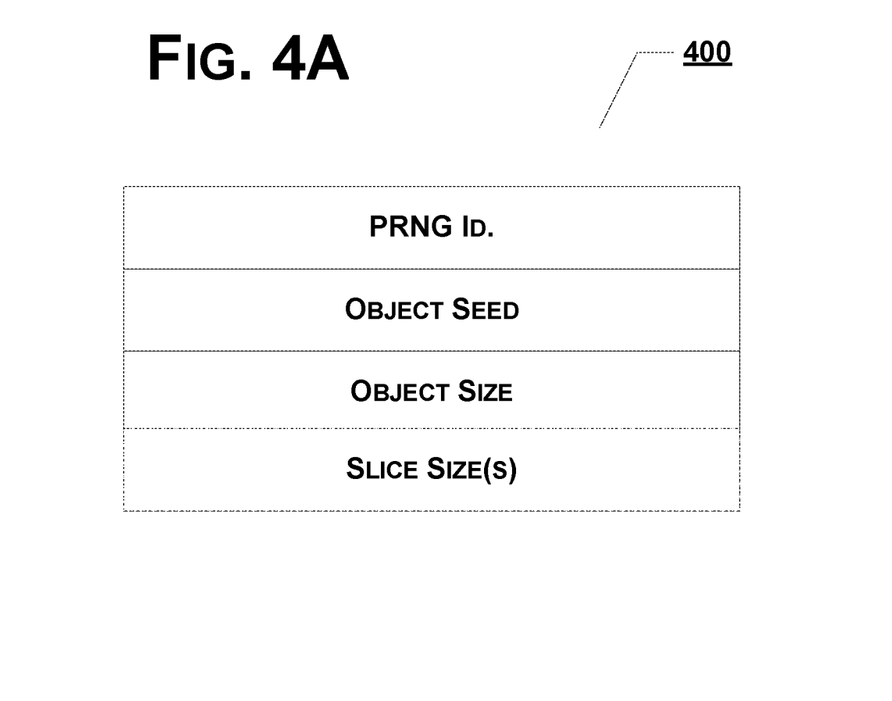
FIGS. 4A-4B are exemplary data structures used by the testing mechanisms according to exemplary embodiments hereof.

A randomly generated test object may be defined by the following parameters: (1) the object's size (e.g., in bytes); (2) the identity of the PRNG used to generate the object; (3) a seed for the object. The object definition may also include (4) the slice size (or sizes) for the object. Slice size(s), if provided, may be specified as a value or range. Given these values, an entity (e.g., the testing mechanism 208) can generate the entire object. The various parameters that define an test object may be specified in a test object manifest 400 (e.g., as shown in FIG. 4A), and the testing mechanism 208 may be provided with a test object manifest 400 (as shown in FIG. 4A), identifying the PRNG mechanism used, the object seed, the size of the object, and, optionally, the slice size range(s).

If only one PRNG is used by the testing system then the manifest may exclude that field or information Verifying the integrity of a pseudo-randomly generated object is straightforward if one starts from the beginning of the object: use the known PRNG mechanism and seed and simply compute the bytes in order from the beginning. However, when testing ranges of an object, and especially a very large object, this approach becomes computationally expensive. For example, to test that, e.g., the fifth gigabyte of a large object is being delivered correctly, the testing mechanism would have to calculate four gigabytes ($2^{32}$) pseudo-random numbers before the PRNG mechanism was in the right state to start the object verification.

Figure 4B:
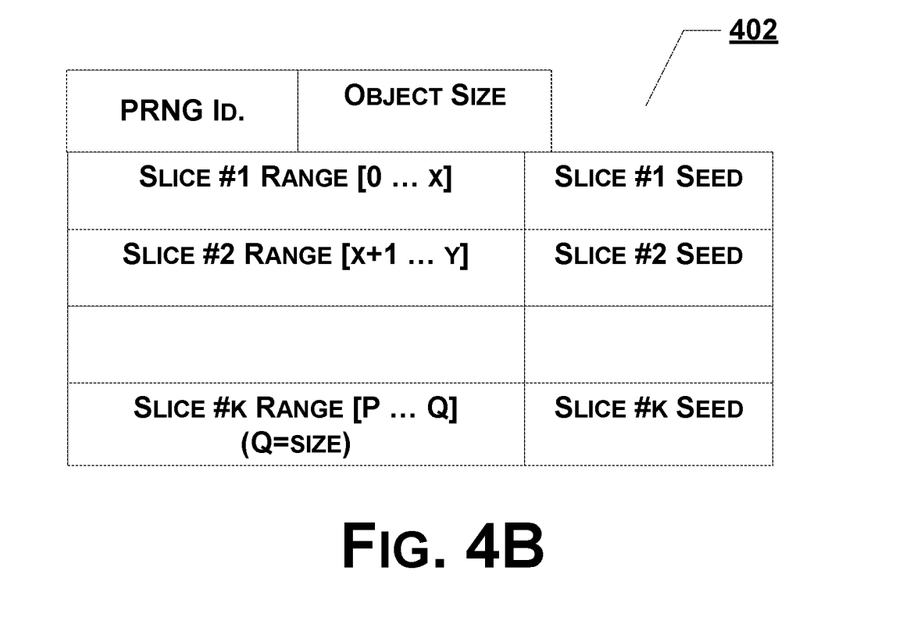

In order to avoid having the testing mechanism generate potentially large unneeded portions of the test object, a test object descriptor 402 (e.g., as shown in FIG. 4B), may be used. An exemplary test object descriptor 402 includes: (i) an identifier of the PRNG mechanism; (ii) the object's size (e.g., in bytes); (iii) an indication of each slice, preferably as a size (e.g., in bytes) or as an offset (e.g., in bytes) from the previous slice (with the first offset being relative to the start of the object); and (iv) a seed for each slice. As should be appreciated, assuming contiguous slices, given each slice's size allows computation of each slice's offset. In the example of FIG. 4B, the first slice ranges from offset 0 (the start of the object) to offset X; the second slice ranges from offset X+1 to offset Y, and so on, with the K-th slice ranging from offset P to offset Q (where Q is the size of the object). Each slice has a corresponding seed, so that, in general, the j-th slice can be generated using the j-th seed.

Again, if the testing system uses only one PRNG, then the manifest may exclude that field or information.

The test object descriptor 402 may be provided to a testing mechanism 208, e.g., from the object integrity verification mechanism 116. Appropriate techniques (e.g., MD5 signatures) may be used to confirm the integrity of the descriptor 402. In some embodiments, the testing mechanism 208 may be provided with a test object manifest 400 and use the information therein to generate a test object descriptor 402.

In one embodiment, in order to generate the test object descriptor 402, the testing mechanism 208 needs the identity of the PRNG mechanism, the object seed, and the object size (e.g., from a test object manifest 200). The size range of the slices may be provided in the test object manifest 400 or may be predefined for the testing system. For example, the system may require that all slices range in size from L to H, for some values L and H, or these slice ranges may be provided in the test object manifest 400.

Given (i) an identified PRNG mechanism; (ii) an object seed; (iii) the object size (or size range); and (iv) the size range of object slices (e.g., L and H), with reference to the flow chart in FIG. 5, a test object descriptor 402 may be generated as follows: In some implementations the object size may be in a specified range (e.g., $S_{low}$ to $S_{high}$) in the manifest, in which case the size needs to be generated. First, use the object seed and the identified PRNG (from the test object manifest 200) to generate the object size (at 502). If the size is specified exactly in the manifest then this step is omitted.

Figure 5:
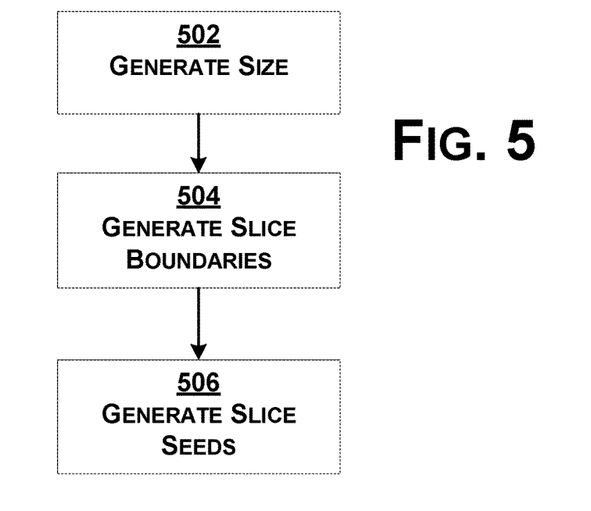
FIGS. 5 and 6A-6B are flowcharts showing aspects of the system according to exemplary embodiments hereof.

Then, generate pairs of slice ranges (boundaries, at 504) and corresponding slice seeds (at 506). Preferably the system generates slices to be within some constraints (some larger than system sizes, some smaller, etc.). The underlying system may be implemented to request and/or transfer blocks of one or more particular sizes, typically as powers of two. Preferably a range covers multiple implementation block sizes.

As will be appreciated, the test object descriptor 402 generated by the testing mechanism 208 on the client side must generate the various fields using the same PRNG and seed, and in the same order, as the object descriptor is generated on the server side.

Thus, e.g., each slice seed may be generated right after each slice boundary, as long as this approach is used by all entities generating a test object descriptor 402.

As noted, in some variations the slice boundaries may be set (not random), in which case manifest has set boundaries and seeds for content. This type of manifest can also be generated with one seed plus parameters. In some cases, the manifest may specify what is random and what is not random.

Example

Suppose, e.g., a test object manifest has the following values:
PRNG ID.=rand( )
Object seed=OS;
Object size range=$OS_L$ to $OS_H$
Slice size ranges=$SS_L$ to $SS_H$ The PRNG=rand( ), invoked k times, with a seed SS, produces the pseudo-random sequence $r_1, r_2, \ldots, r_k$.

In this example the size is given as a range, so (at 502), invoke rand( ), producing $r_1$ and convert $r_1$ into a number in the range $OS_L$ to $OS_H$. This number is the object size. Next (at 504) invoke rand( ) to generate slice boundaries (sizes), where each slice is in the range $SS_L$ to $SS_H$. The last slice is the slice that does not pass object size. Next (at 506) invoke rand( ) to generate slice seeds for each of the slices.

The mechanisms described here may be used to test for transfer errors/bugs of randomly generated test resources and may test for one or more of:
1. Random sized test objects
2. Random slices (slice boundaries—e.g., based on size)
3. Random slice seed per slice
4. Random block sizes (random requests for random ranges and offsets).

As should be appreciated, upon reading this description, embodiments hereof are able to efficiently validate arbitrary subranges of the test of object, including requests for less (sometimes significantly less) than the full object.

End of Example

Given a test object manifest (e.g., as described above), a testing mechanism 208 can generate only the slices of the object needed to verify a received block.

Figure 6A:
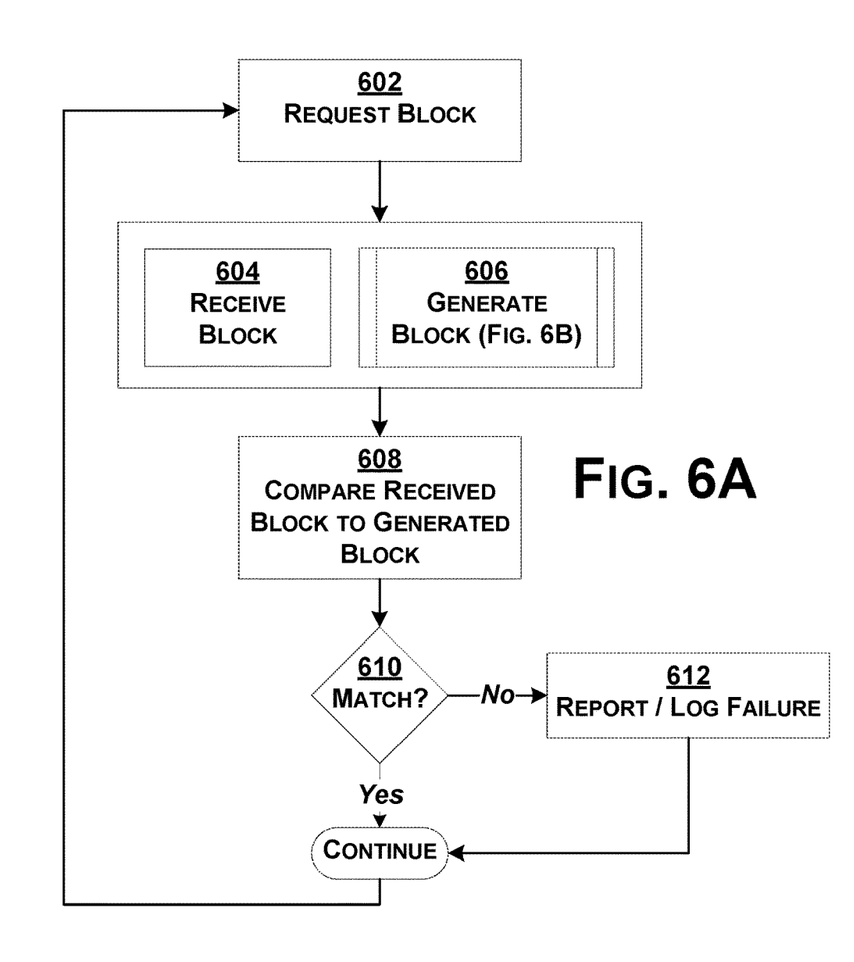
Figure 6B:
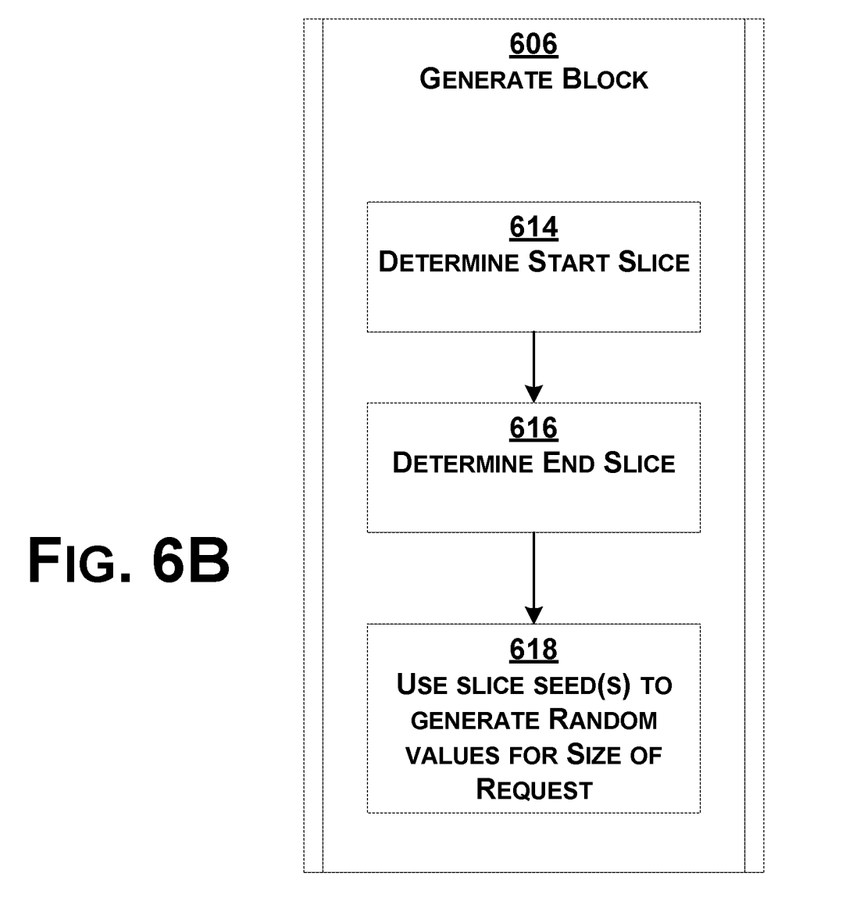

With reference to the flow charts in FIGS. 6A-6B, a testing mechanism 208 requests a block of a test object specified, e.g., by a test object descriptor 402 (assume that the testing mechanism 208 was either provided the descriptor or generated it using a manifest, as described above).

First, the testing mechanism 208 requests a block B. For the sake of this description, assume that the requested block is at offset O and of size R. The testing mechanism may use a PRNG to generate the request (e.g., the offset and size).

The testing mechanism 208 receives the block (at 604) and generates a copy of the requested block (at 606). The receiving (at 604) and generation (at 606) may take place in parallel. The received block is then compared to the generated block (at 608). If the blocks match (at 610), then the testing mechanism continues (e.g., to test another block). If the blocks do not match (at 610), then the testing mechanism reports/logs the failure (at 612) and may then continue (e.g., to test another block). The reporting/logging (at 612) may provide information to enable the test to be repeated (e.g., the block offset and size and where the error or mismatch was found). The reporting/logging may also provide or be associated with the test object manifest 400 and/or descriptor 402.

Preferably the reporting specifies which specific byte(s) failed, and request logs may be used to help determine the cause of the failure. The failure reporting (in 612) may identify and mark the bytes or sequence of bytes that failed.

The block generation (at 606) is described in greater detail in the flowchart in FIG. 6B. First, determine the start slice (at 614), i.e., the slice in which the block starts. Recall, as discussed above with reference to FIGS. 3B-3D, a requested block may span one or more slices. The offset O may be compared to the slice information in the test object descriptor 402 to determine the start slice. Then (at 616) determine the last slice spanned by the requested block, again using the slice information in the test object descriptor. The testing mechanism 208 may then use the start slice seed(s) to generate (at 618) the slice(s) containing the requested block. In the case of a very large block, the block generation may produce one slice at a time so that the comparison (in 608, FIG. 6A) can occur in parallel with the block generation (at 606).

It may not be necessary to generate the entire last/end slice, as only sufficient values are needed to cover the size of the requested object.

The requested object may be entirely within one slice, e.g., as shown in the example in FIG. 3B. In such cases the start slice (determined at 614) and the end slice (determined at 616) will be the same slice.

On the server side, the test object may be generated (as described above), or in full. For some aspects of testing it may be preferable to have the entire test object on the server side.

Failure may occur (at 610) for a number of reasons, for example, intermediate nodes may be trying to avoid caching a full large object. Another reason for failure, is the case where only a range (or ranges) of the large object is (are) being requested, and there are errors either in retrieving the pieces of a single stored large object, or in assembling the response from multiple blocks of a large object.

In some cases, at least one client request should be for multiple parts of a randomly generated test object in a single transaction (e.g., an HTTP range request with multiple ranges which results in a single multipart/byterange response). In general, a client request may include multiple ranges, as failure modes associated with such multiple range requests are not the same as the failure modes associated with issuing separate requests for each range.

The cause of a failed match (at 610) may be specific to the particular client and server involved in the test, and may not be able to be replicated.

DISCUSSION

The testing system described allows a CDN operator or other entity to verify that a CDN cache is serving correct content where the content is a test resource (not actual resource).

Randomly generated resources have a number of advantages, including that they are resilient to the kinds of artifacts (e.g., aligning objects at implementation boundaries or creating objects with sizes that are powers of two) that might give false positives. Randomly generated resources preferably have no or few repeating sequences and so can be more reliable when testing the transport of blocks (or parts) of a resource.

The system described herein allows a tester to stress system to verify that the resource is being served correctly for a range of a resource or for multiple ranges of a resource.

In the embodiments in which files are broken up into ranges and the ranges themselves are random, a file may be specified by a single seed or a manifest of seeds (the single seed may be used to generate the manifest of seeds). A benefit of this approach is that the test mechanism need only generate numbers for the slice(s) of the resource that the requested block is in.

Computing

The services, mechanisms, operations and acts shown and described above are implemented, at least in part, by software running on one or more computers of a CDN.

Programs that implement such methods (as well as other types of data) may be stored and transmitted using a variety of media (e.g., computer readable media) in a number of manners. Hard-wired circuitry or custom hardware may be used in place of, or in combination with, some or all of the software instructions that can implement the processes of various embodiments. Thus, various combinations of hardware and software may be used instead of software only.

One of ordinary skill in the art will readily appreciate and understand, upon reading this description, that the various processes described herein may be implemented by, e.g., appropriately programmed general purpose computers, special purpose computers and computing devices. One or more such computers or computing devices may be referred to as a computer system.

Figure 7:
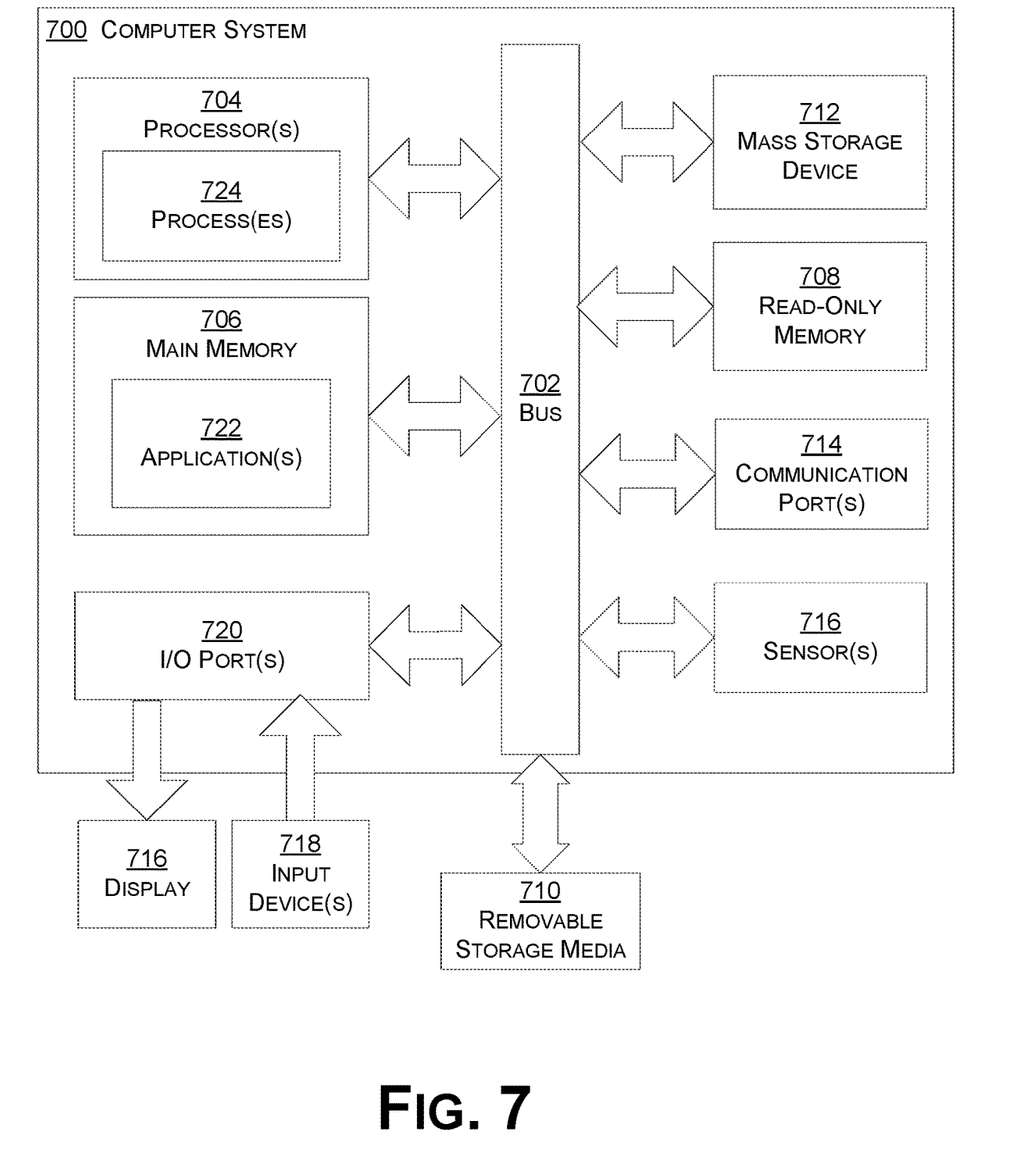
FIG. 7 depicts aspects of computing according to exemplary embodiments hereof.

FIG. 7 is a schematic diagram of a computer system 700 upon which embodiments of the present disclosure may be implemented and carried out.

According to the present example, the computer system 700 includes a bus 702 (i.e., interconnect), one or more processors 704, a main memory 706, read-only memory 708, removable storage media 710, mass storage 712, and one or more communications ports 714. Communication port 714 may be connected to one or more networks by way of which the computer system 700 may receive and/or transmit data.

As used herein, a "processor" means one or more microprocessors, central processing units (CPUs), computing devices, microcontrollers, digital signal processors, or like devices or any combination thereof, regardless of their architecture. An apparatus that performs a process can include, e.g., a processor and those devices such as input devices and output devices that are appropriate to perform the process.

Processor(s) 704 can be any known processor, such as, but not limited to, an Intel® Itanium® or Itanium 2® processor(s), AMD® Opteron® or Athlon MP® processor(s), or Motorola® lines of processors, and the like. Communications port(s) 714 can be any of an RS-232 port for use with a modem based dial-up connection, a 10/100 Ethernet port, a Gigabit port using copper or fiber, or a USB port, and the like. Communications port(s) 714 may be chosen depending on a network such as a Local Area Network (LAN), a Wide Area Network (WAN), a CDN, or any network to which the computer system 700 connects. The computer system 700 may be in communication with peripheral devices (e.g., display screen 716, input device(s) 718) via Input/Output (I/O) port 720.

Main memory 706 can be Random Access Memory (RAM), or any other dynamic storage device(s) commonly known in the art. Read-only memory 708 can be any static storage device(s) such as Programmable Read-Only Memory (PROM) chips for storing static information such as instructions for processor 704. Mass storage 712 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices may be used.

Bus 702 communicatively couples processor(s) 704 with the other memory, storage, and communications blocks. Bus 702 can be a PCI/PCI-X, SCSI, a Universal Serial Bus (USB) based system bus (or other) depending on the storage devices used, and the like. Removable storage media 710 can be any kind of external hard-drives, floppy drives, IOMEGA® Zip Drives, Compact Disc-Read Only Memory (CD-ROM), Compact Disc-Re-Writable (CD-RW), Digital Versatile Disk-Read Only Memory (DVD-ROM), etc.

Embodiments herein may be provided as one or more computer program products, which may include a machine-readable medium having stored thereon instructions, which may be used to program a computer (or other electronic devices) to perform a process. As used herein, the term "machine-readable medium" refers to any medium, a plurality of the same, or a combination of different media, which participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory, which typically constitutes the main memory of the computer. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications.

The machine-readable medium may include, but is not limited to, floppy diskettes, optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols; and/or (iv) encrypted in any of a variety of ways well known in the art.

A computer-readable medium can store (in any appropriate format) those program elements that are appropriate to perform the methods.

As shown, main memory 706 is encoded with application(s) 722 that supports the functionality discussed herein (the application 722 may be an application that provides some or all of the functionality of the CD services described herein, including rendezvous services). Application(s) 722 (and/or other resources as described herein) can be embodied as software code such as data and/or logic instructions (e.g., code stored in the memory or on another computer readable medium such as a disk) that supports processing functionality according to different embodiments described herein.

During operation of one embodiment, processor(s) 704 accesses main memory 706 via the use of bus 702 in order to launch, run, execute, interpret or otherwise perform the logic instructions of the application(s) 722. Execution of application(s) 722 produces processing functionality of the service related to the application(s). In other words, the process(es) 724 represent one or more portions of the application(s) 722 performing within or upon the processor(s) 704 in the computer system 700.

It should be noted that, in addition to the process(es) 724 that carries (carry) out operations as discussed herein, other embodiments herein include the application 722 itself (i.e., the un-executed or non-performing logic instructions and/or data). The application 722 may be stored on a computer readable medium (e.g., a repository) such as a disk or in an optical medium. According to other embodiments, the application 722 can also be stored in a memory type system such as in firmware, read only memory (ROM), or, as in this example, as executable code within the main memory 706 (e.g., within Random Access Memory or RAM). For example, application 722 may also be stored in removable storage media 710, read-only memory 708 and/or mass storage device 712.

Those skilled in the art will understand that the computer system 700 can include other processes and/or software and hardware components, such as an operating system that controls allocation and use of hardware resources.

As discussed herein, embodiments of the present invention include various steps or operations. A variety of these steps may be performed by hardware components or may be embodied in machine-executable instructions, which may be used to cause a general-purpose or special-purpose processor programmed with the instructions to perform the operations. Alternatively, the steps may be performed by a combination of hardware, software, and/or firmware. The term "module" refers to a self-contained functional component, which can include hardware, software, firmware or any combination thereof.

One of ordinary skill in the art will readily appreciate and understand, upon reading this description, that embodiments of an apparatus may include a computer/computing device operable to perform some (but not necessarily all) of the described process.

Embodiments of a computer-readable medium storing a program or data structure include a computer-readable medium storing a program that, when executed, can cause a processor to perform some (but not necessarily all) of the described process.

Where a process is described herein, those of ordinary skill in the art will appreciate that the process may operate without any user intervention. In another embodiment, the process includes some human intervention (e.g., a step is performed by or with the assistance of a human).

As used herein, including in the claims, the phrase "at least some" means "one or more," and includes the case of only one. Thus, e.g., the phrase "at least some services" means "one or more services", and includes the case of one service.

As used herein, including in the claims, the phrase "based on" means "based in part on" or "based, at least in part, on," and is not exclusive. Thus, e.g., the phrase "based on factor X" means "based in part on factor X" or "based, at least in part, on factor X." Unless specifically stated by use of the word "only", the phrase "based on X" does not mean "based only on X."

As used herein, including in the claims, the phrase "using" means "using at least," and is not exclusive. Thus, e.g., the phrase "using X" means "using at least X." Unless specifically stated by use of the word "only", the phrase "using X" does not mean "using only X."

In general, as used herein, including in the claims, unless the word "only" is specifically used in a phrase, it should not be read into that phrase.

As used herein, including in the claims, the phrase "distinct" means "at least partially distinct." Unless specifically stated, distinct does not mean fully distinct. Thus, e.g., the phrase, "X is distinct from Y" means that "X is at least partially distinct from Y," and does not mean that "X is fully distinct from Y." Thus, as used herein, including in the claims, the phrase "X is distinct from Y" means that X differs from Y in at least some way.

As used herein, including in the claims, a list may include only one item, and, unless otherwise stated, a list of multiple items need not be ordered in any particular manner. A list may include duplicate items. For example, as used herein, the phrase "a list of CDN services" may include one or more CDN services.

It should be appreciated that the words "first" and "second" in the description and claims are used to distinguish or identify, and not to show a serial or numerical limitation. Similarly, the use of letter or numerical labels (such as "(a)", "(b)", and the like) are used to help distinguish and/or identify, and not to show any serial or numerical limitation or ordering.

No ordering is implied by any of the labeled boxes in any of the flow diagrams unless specifically shown and stated. When disconnected boxes are shown in a diagram, the activities associated with those boxes may be performed in any order, including fully or partially in parallel.

While the invention has been described in connection with what is presently considered to be the most practical and preferred embodiments, it is to be understood that the invention is not to be limited to the disclosed embodiment, but on the contrary, is intended to cover various modifications and equivalent arrangements included within the spirit and scope of the appended claims.

I claim:

1. A computer-implemented method comprising:
   (A) requesting, by a client from a content delivery (CD) network, one or more parts of a randomly generated test object comprising a plurality of logical slices;
   (B) in response to said requesting, receiving, by the client, one or more response objects;
   (C) generating one or more portions of said randomly generated test object, and
   (D) comparing the one or more response objects received in (B) to at least some of the one or more portions generated in (C);
   (E) based on said comparing in (D), when said one or more response objects received in (B) do not match said at least some of the one or more portions generated in (C), reporting and logging an error.

2. The method of claim 1 wherein a part of said one or more parts is a block specified by offset and range relative to the start of the randomly generated test object.

3. The method of claim 1 wherein said randomly generated test object was generated using a given pseudorandom number generator (PRNG) and a given seed, and wherein said generating in (D) uses the same PRNG and the same given seed.

4. The method of claim 1 wherein the test object comprises a plurality of logical slices, and wherein said generating of said portion in (C) generates only portions of said slices spanned by the one or more parts of the randomly generated test object requested in (A).

5. The method of claim 1 wherein the one or more parts of the randomly generated test object requested in (A) are contained entirely within one logical slice of said randomly generated test object.

6. The method of claim 5 wherein the one or more parts of the randomly generated test object requested in (A) span multiple logical slices of said randomly generated test object.

7. The method of claim 4, wherein said generating of said one or more slices in (C) uses a seed associated with each of said slices to generate said portions of said slices.

8. The method of claim 1 wherein said randomly generated test object is specified by seed.

9. The method of claim 8 wherein said randomly generated test object is also specified by an object size.

10. The method of claim 9 wherein said randomly generated test object is also specified by an identity of a pseudorandom number generator (PRNG).

11. The method of claim 9 wherein said randomly generated test object is also specified by slice information.

12. The method of claim 8 wherein the client is provided with the seed.

13. The method of claim 1 wherein the one or more response objects were received from one or more servers in the CD network, and wherein each of the one or more servers generated or obtained at least a part of the randomly generated test object prior to serving a requested part to the client.

14. The method of claim 13 wherein at least one of the one or more servers generated or obtained the entire randomly generated test object prior to serving a requested part to the client.

15. The method of claim 1 wherein the one or more parts consist of exactly one part.

16. The method of claim 15 wherein the one or more response objects consist of exactly one response object.

17. The method of claim 1 wherein said requesting in (A) comprises an HTTP range request with multiple ranges.

18. The method of claim 1 wherein said requesting in (A) requests multiple parts of said randomly generated test object, and wherein said receiving in (B) receives one response object.

19. An article of manufacture comprising a non-transitory computer-readable medium having program instructions stored thereon, the program instructions, operable on a computer system, wherein execution of the program instructions by one or more processors of said computer system causes the one or more processors to carry out the acts of:

(A) requesting, by a client from a content deliver (CD) network, one or more parts of a randomly generated test object comprising a plurality of logical slices;
(B) in response to said requesting, receiving, by the client, one or more response objects;
(C) generating one or more portions of said randomly generated test object, and
(D) comparing the one or more response objects received in (B) to at least some of the one or more portions generated in (C);
(E) based on said comparing in (D), when said one or more response objects received in (B) do not match said at least some of the one or more portions generated in (C), reporting and logging an error.

20. A device comprising:
at least one processor;
memory, operatively connected to the at least one processor and storing instructions that, when executed by the at least one processor, cause the at least one processor to perform a method, the method comprising:
(A) requesting, by a client from a content delivery (CD) network, one or more parts of a randomly generated test object comprising a plurality of logical slices;
(B) in response to said requesting, receiving, by the client, one or more response objects;
(C) generating one or more portions of said randomly generated test object, and
(D) comparing the one or more response objects received in (B) to at least some of the one or more portions generated in (C);
(E) based on said comparing in (D), when said one or more response objects received in (B) do not match said at least some of the one or more portions generated in (C), reporting and logging an error.

* * * * *